United States Patent Office 3,288,834
Patented Nov. 29, 1966

3,288,834
2-PROPYNYL ESTER OF SUBSTITUTED (2-PROPYNYLOXY)BENZOIC ACIDS
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,690
7 Claims. (Cl. 260—470)

The novel compounds of the present invention correspond to the formula:

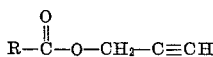

In this and succeeding formulae, R represents 2-(propargylthio)phenyl, 2-propargyloxyphenyl, 4-propargyloxyphenyl, 2,4-dipropargyloxyphenyl, 2,6 - dipropargyloxyphenyl, 3,4,5 - tripropargyloxyphenyl, ar-monohalopropargyloxyphenyl, ar-monomethyl-propargyloxyphenyl and ar-monophenyl-2-propargyloxyphenyl. These new compounds are liquid or solid materials which are somewhat soluble in many common organic solvents and of low solubility in water. The compounds have been found to be useful as pesticides for the control of various plant and animal species such as worms, insects, mites, bacteria, fungi, fish, radish, crabgrass and tomato plants.

The compounds of the present invention are prepared by reacting propargyl halide with a substituted benzoic acid compound corresponding to the formula

wherein $R_1$ represents 2-mercaptophenyl, 2-hydroxyphenyl, 4-hydroxyphenyl, 2,4-dihydroxyphenyl, 2,6-dihydroxyphenyl, 3,4,5 - trihydroxyphenyl, ar-monohalo-hydroxyphenyl, ar-monomethyl-hydroxyphenyl and ar-monophenyl-2-hydroxyphenyl. Representative monohalo-hydroxyphenyl, monomethyl-hydroxyphenyl and monophenyl-2-hydroxyphenyl include 2-hydroxy-4-methylphenyl, 2-hydroxy-5-methylphenyl, 3-hydroxy-2-methylphenyl, 3-hydroxy-4-methylphenyl, 3 - hydroxy-6-methylphenyl, 4-hydroxy-2-methylphenyl, 4-hydroxy-3 - methylphenyl, 2-hydroxy-4 - iodophenyl, 2 - hydroxy-6 - chlorophenyl, 3-hydroxy-2-chlorophenyl, 3-hydroxy - 4-bromophenyl, 3-hydroxy-5-bromophenyl, 4-hydroxy-2-chlorophenyl, and 2-hydroxy-6-phenylphenyl.

The reaction is carried out in the presence of a basic material and preferably in the presence of an organic liquid such as isopropanol, acetone, acetone-benzene and methyl ethyl ketone, as reaction medium.

The reaction takes place smoothly at temperatures at which halide of reaction is formed and preferably from about 0° to 100° C. The halide of reaction appears in the reaction medium as the halide salt of the alkali metal moiety from the employed basic material. The reaction consumes one molecule each of propargyl halide and basic material for each hydroxyl moiety to be found in a molecule of the substituted benzoic acid starting material. For example, one molecule of trihydroxybenzoic acid, when completely reacted, will consume four molecules of propargyl halide. For optimum yields, the use of starting materials in amounts which represent such proportions is preferred. Upon completion of the reaction, the desired product can be separated and purified by conventional procedures.

In carrying out the reaction, substituted benzoic acid, propargyl halide and basic material such as an alkali metal carbonate can be combined in any convenient fashion. However, it is preferable to disperse them in an organic solvent, as reaction medium. The mixture is maintained at a temperature in the reaction temperature range to insure completion of the reaction. The substantial cessation in the production of the halide of reaction indicates that the reaction is nearing completion. The halide of reaction can be removed from the reaction mixture by such conventional procedures as filtration or washing with water. The product-containing organic layer can then be employed as the toxic constituent in pesticidal applications. If a product of greater purity is desired, the filtered reaction mixture can be washed with water and the product-containing organic layer, obtained during the washing procedure, heated to remove the low boiling constituents and obtain the product as a solid or liquid residue. This product residue can be further purified by recrystallization from or extraction with common organic solvents.

The following examples merely illustrate the invention and are not to be construed as limiting.

*Example 1.—2-propynyl o-2-propynyloxy benzoate*

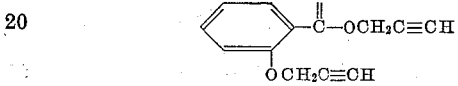

Salicylic acid (69 grams; 0.50 mole), propargyl bromide (120 grams; 1 mole) and potassium carbonate (140 grams; 1 mole) were dispersed in 500 milliliters of acetone and the resulting mixture heated with stirring at the boiling temperature and under reflux for thirty hours. Following this heating period 60 milliliters of aqueous 33 percent sodium hydroxide was added to the reaction mixture and the resulting mixture reheated for a short time. The reaction mixture was diluted with water and the organic layer, which separated during the dilution procedure was collected and distilled under reduced pressure to separate the 2-propynyl o-(2-propynyloxy)benzoate product as a liquid material. This product had a boiling point of 164° C. at 2.5 millimeters of pressure and a refractive index n/D of 1.5506 at 25° C. Upon standing, the liquid product solidified and the product in the solid state melted at 63–64° C.

*Example 2.—2-propynyl 5-bromo-2-(2-propynyloxy)benzoate*

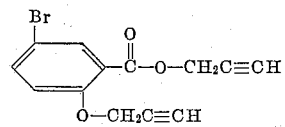

5-bromo-salicyclic acid (36 grams) propargyl bromide (45 grams) and potassium carbonate (50 grams) were dispersed in 500 milliliters of acetone and the resulting mixture heated with stirring at the boiling temperature and under reflux for twenty-four hours. The reaction mixture was then combined with 30 milliliters of aqueous 33 percent sodium hydroxide and the resulting mixture heated for a short time. The reaction mixture was washed with water and the organic layer obtained during washing procedure collected. Upon standing for a short time the 2-propynyl 5-bromo-2-(2-propynyloxy)benzoate product solidified. This product, upon recrystallization from ethanol, had a melting point of 84–86° C.

*Example 3.—2-propynyl 5-phenyl-2-(2-propynyloxy)benzoate*

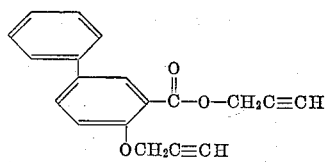

5-phenyl salicylic acid (50 grams), propargyl bromide (110 grams), and potassium carbonate (110 grams) were dispersed in 500 milliliters of acetone. The resulting mixture was heated to the boiling temperature and maintained at that temperature, under reflux, for thirty hours. The reaction mixture was then combined with 80 milliliters of aqueous 25 percent sodium hydroxide and the mixture reheated for a short time. The organic product layer was obtained in the manner taught in Example 2. This organic layer was then heated to remove the low boiling constituents and obtain the 2-propynyl 5-phenyl-2-(2-propynyloxy)benzoate product as a solid residue melting at 35–37° C.

*Example 4.—2-propynyl 2-(2-propynyloxy)-3-methylbenzoate*

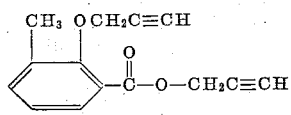

2-hydroxy-3-methylbenzoic acid (30 grams), propargyl bromide (50 grams) and potassium carbonate (58 grams) were dispersed in 400 milliliters of acetone. The resulting mixture was processed as set forth in Example 1 to obtain the 2-propynyl 2-(2-propynyloxy)-3-methylbenzoate as a liquid residue with a refractive index $n/D$ of 1.5368 at 25° C.

*Example 5.—2-propynyl 3,4,5-tri(2-propynyloxy) benzoate*

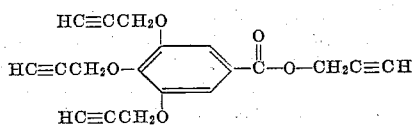

Gallic acid (42 grams), propargyl bromide (125 grams) and potassium carbonate (140 grams) were dispersed in 500 milliliters of acetone. The resulting mixture was heated with stirring at the boiling temperature and under reflux for twenty-four hours. The reaction mixture was combined with 120 milliliters of aqueous 33 percent sodium hydroxide and the resulting mixture heated for a short time. The warm reaction mixture was then filtered to remove the halide of reaction and the filtrate diluted with water. The organic layer which separated during the dilution procedure was removed by decantation and heated to remove the low boiling constituents and obtain the 2-propynyl 3,4,5-tri(2-propynyloxy)benzoate product. This product was a liquid material having a refractive index $n/D$ of 1.5444 at 25° C. Upon standing, the liquid product solidified and was found to melt at 77–79° C.

*Example 6.—2-propynyl 2-(2-propynylthio)benzoate*

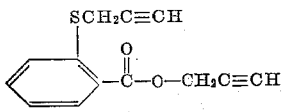

o-Mercaptobenzoic acid (26 grams), propargyl bromide (45 grams) and potassium carbonate (50 grams) were dispersed in 400 milliliters of acetone. The mixture was heated with stirring at the boiling temperature and under reflux for forty hours. The reaction mixture was then combined with 30 milliliters of aqueous 33 percent sodium hydroxide solution and the resulting mixture heated for a short time. The warm reaction mixture was then filtered and the filtrate heated to remove the low boiling constituents and obtain the 2-propynyl 2-(2-propynylthio)benzoate product as a liquid residue. The product had a refractive index $n/D$ of 1.6205 at 25° C.

Other compounds of the present invention can be obtained as follows.

2-propynyl 2,4-bis(2-propynyloxy)benzoate (melting at 103–105° C.) by reacting together 2,4-dihydroxybenzoic acid, propargyl chloride and potassium carbonate.

2-propynyl 2,6-bis(2-propynyloxy)benzoate (melting at 98–100° C.) by reacting together 2,6-dihydroxybenzoic acid, propargyl bromide and potassium carbonate.

2-propynyl 3-phenyl-2-(2 - propynyloxy)benzoate (refractive index $n/D$ of 1.5647 at 25° C.) by reacting together 3-phenyl salicylic acid, propargyl bromide and potassium carbonate.

2-propynyl 3-bromo-4-(2-propynyloxy)benzoate (melting at 94–96° C.) by reacting together 3-bromo-4-hydroxy benzoic acid, propargyl bromide and potassium carbonate.

2-propynyl 5-chloro-2-(2-propynyloxy)benzoate (refractive index $n/D$ of 1.5480 at 25° C.) by reacting together 5-chloro salicylic acid, propargyl bromide and potassium carbonate.

2-propynyl 5-iodo-2-(2-propynyloxy)benzoate (melting at 67–68° C.) by reacting together 5-iodosalicylic acid, propargyl bromide and potassium carbonate.

2-propynyl 6-methyl-2-(2-propynyloxy)benzoate (molecular weight 228.2) by reacting together propargyl chloride, potassium carbonate and 2-hydroxy-6-methylbenzoic acid.

2-propynyl 5-methyl-3-(2-propynyloxy)benzoate (molecular weight 228.2) by reacting together propargyl bromide, potassium carbonate and 3-hydroxy-5-methylbenzoic acid.

2-propynyl 3-iodo-2-(2-propynyloxy)benzoate (molecular weight 340.1) by reacting together propargyl chloride, sodium carbonate and 2-hydroxy-3-iodobenzoic acid.

2-propynyl 5-bromo-3-(2-propynyloxy)benzoate (molecular weight 293.1) by reacting together propargyl chloride, sodium carbonate and 3-hydroxy-5-bromobenzoic acid.

2-propynyl 6-chloro-3-(2-propynyloxy)benzoate (molecular weight 248.6) by reacting together propargyl bromide, potassium carbonate and 3-hydroxy-6-chlorobenzoic acid.

2-propynyl 4-phenyl-2-(2-propynyloxy)benzoate (molecular weight 290.3) by reacting together propargyl chloride, potassium carbonate and 2-hydroxy-4-phenylbenzoic acid.

The new compounds of the present invention are useful as herbicides and parasiticides for the control of a number of plant and parasite species. For such uses the unmodified compound can be employed. The product can be dispersed on a finely divided solid and employed as a dust. Also, such mixtures can be dispersed in water with or without the aid of a surface active dispersing agent and the resulting aqueous suspension employed as a spray, drench or wash. In other procedures, the products are employed as the toxic constituents in solvent solutions, oil-in-water or water-in-oil emulsions or aqueous dispersions. In representative operations, aqueous compositions containing 2-propynyl 5-iodo-2-(2-propynyloxy) benzoate at concentrations of 500 parts per million give substantially complete kills of two spotted spider mites. In other operations, kills of northern fat-headed minnows are obtained when 2-propynyl 2,6-bis(2-propynyloxy) benzoate is introduced into their environment at levels of one part per million by weight.

The halosalicylic acid starting materials employed in accordance with the present invention are prepared by known methods. In such a method, salicylic acid is allowed to react with chlorine or bromine in the presence of iron as catalysts and in the presence of an organic solvent as reaction medium. It is also possible to perform the halogenation by using ferric chloride, ferric bromide, aluminum chloride or aluminum bromide. The iodination of salicylic acid is accomplished by reacting salicylic acid with hydrogen iodide in the presence of nitric acid or mercuric oxide. Following the reactions, the products can be separated by fractional distillation under reduced pressure.

The phenylsalicylic acid compounds employed as starting materials in accordance with the teachings of the present invention are prepared in known procedures. In one such known procedure, the Kolbe-Schmitt synthesis, wherein phenylphenol is allowed to react with carbon dioxide at 100°–200° C. and under pressure, is used to obtain the sodium salt of phenyl salicylic acid. The phenyl salicylic acid can be obtained by adding enough acid, such as hydrochloric acid, to precipitate the phenyl salicylic acid which can then be purified by conventional procedures.

We claim:
1. A compound corresponding to the formula

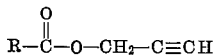

wherein R represents a member of the group consisting of 2-(propargylthio)phenyl, 2-propargyloxyphenyl, 4-propargyloxyphenyl, 2,4-dipropargyloxyphenyl, 2,6-dipropargyloxyphenyl, 3,4,5 - tripropargyloxyphenyl, ar-monomethyl-propargyloxyphenyl, ar-monohalopropargyloxyphenyl and ar-monophenyl-2-propargyloxyphenyl.

2. 2-propynyl 2-(2-propynyloxy)benzoate.
3. 2-propynyl 3-phenyl-2-(2-propynyloxy)benzoate.
4. 2-propynyl 2-(2-propynyloxy)-3-methylbenzoate.
5. 2-propynyl 2,6-bis(2-propynyloxy)benzoate.
6. 2-propynyl 2-(2-propynylthio)benzoate.
7. 2-propynyl 5-chloro-2-(2-propynyloxy)benzoate.

References Cited by the Examiner
UNITED STATES PATENTS
3,097,230    7/1963    Miller _____ 260—473

LORRAINE A. WEINBERGER, *Primary Examiner.*
S. B. WILLIAMS, *Assistant Examiner.*